Nov. 27, 1962  H. F. SAMPSON  3,065,666
UNDERWATER CAMERA CONSTRUCTION
Filed Dec. 7, 1959  5 Sheets-Sheet 1

INVENTOR.
HERBERT F. SAMPSON
BY Miketta and Glenny
ATTORNEYS.

Nov. 27, 1962

H. F. SAMPSON 3,065,666

UNDERWATER CAMERA CONSTRUCTION

Filed Dec. 7, 1959

INVENTOR.
HERBERT F. SAMPSON
BY
ATTORNEYS.

Nov. 27, 1962 H. F. SAMPSON 3,065,666
UNDERWATER CAMERA CONSTRUCTION
Filed Dec. 7, 1959 5 Sheets-Sheet 5

INVENTOR.
HERBERT F. SAMPSON
BY
ATTORNEYS.

United States Patent Office 3,065,666
Patented Nov. 27, 1962

3,065,666
UNDERWATER CAMERA CONSTRUCTION
Herbert F. Sampson, 1604 Newport Blvd.,
Costa Mesa, Calif.
Filed Dec. 7, 1959, Ser. No. 857,977
6 Claims. (Cl. 88—16)

This invention relates to an underwater camera construction provided with a novel construction and assembly which permits the camera construction to be readily handled, maneuvered, operated, controlled, and serviced and maintained.

Prior proposed underwater or submarine camera constructions have included a camera encased within an external housing having a window for the lens of the camera to view a scene or object to be photographed. Disadvantages of such proposed camera constructions included difficulties in adjustment of focus and aperture of the encased camera when submerged in water, in readily aligning the enclosed camera with respect to a scene to be photographed, in maintaining the camera in a stable position in water, in selectively exposing film while maneuvering the camera, in assembly and disassembly of three external housing and component camera parts and controls, and in interconnecting external control portions with internal control portions upon assembly of the external housing with the enclosed camera.

It will be understood by those skilled in the art of underwater photography that some desired characteristics of an underwater camera include portability, that is, the camera should be light enough to readily carry and yet be heavy enough to be stable in water, control devices for the encased camera particularly aperture and focus controls must be quickly and conveniently operable under water by the cameraman without disturbing the position of the camera, the submerged camera body must be stable under conditions of varying water currents and water surges, calibrations for camera controls should be large and simple and readily visible and operable from one position of the cameraman, such position being the normal taking position of the camera, and the position of the cameraman's eye with respect to the viewfinder should be well rearwardly of the front viewing port and in a zone of reduced illumination.

The present invention contemplates an underwater camera construction in which the disadvantages of prior proposed underwater cameras are overcome and in which the desirable characteristics of an underwater camera construction are achieved. Generally speaking the underwater camera construction of the present invention comprises an external housing cast of lightweight metal with a selected form which facilitates control, operation, assembly and disassembly, and service and maintenance of the underwater camera. The camera construction may comprise a two-piece external camera housing adapted to withstand hydrostatic pressure at great depths and may include a main camera housing portion having a back open end closed and sealed by an end housing portion upon which substantially all of the camera components are mounted for ready reception within the main housing portion through said back opening. External control parts are carried by the housing portion where they may be readily manipulated by the cameraman while viewing scenes and internal portions of the controls are readily interlocked with such external portions during assembly of the housing portions. The housing is so constructed that the optical axis of the camera and front and back viewing windows is offset from the axis of the end housing and a main cylindrical section of the main housing portion in order to provide a compact camera construction while affording an improved view of the scene being photographed both through and above the camera without a major change in position of the head of the cameraman.

The primary object of this invention therefore is to disclose and provide an underwater camera construction of novel structure and assembly arranged to facilitate convenient control and handling of the camera in water.

Another object of the invention is to provide an underwater camera construction adapted to be pressurized by a pressure fluid such as air when it is desired to submerge the camera to a great depth in a body of water.

Another object of the invention is to disclose and provide an underwater camera construction which may be conveniently held, operated and maneuvered by the cameraman.

Still another object of this invention is to disclose and provide an underwater camera construction in which light from the scene being viewed is baffled and deflected within the camera housing in such a manner that the operator may view the scene through the camera without the interference of stray light, the means providing such baffling serving to reinforce the camera housing.

Still another object of this invention is to disclose and provide an underwater camera construction wherein an enlarged film magazine is provided for increasing the film capacity of the underwater camera, such enlarged film magazine being readily releasably attachable to a motion picture casing and which includes novel light-excluding means between the film magazine and the camera casing.

A still further object of the invention is to disclose and provide an underwater camera construction in which a light meter is provided within the external housing for determining light conditions under water, such light meter being positioned for convenient viewing at the back window by the cameraman.

Another object of the invention is to disclose and provide an underwater camera construction provided with means for stabilizing the underwater camera so that in water a condition of neutral buoyancy may be provided.

Still another object of the invention is to disclose and provide an underwater camera construction wherein sighting means are provided on the camera housing and wherein such sighting means may be readily collapsed and folded against the external surface of the housing.

It will be understood by those skilled in the art that many other objects and advantages of the underwater camera construction of this invention will be readily apparent from the following description of the drawings in which an exemplary embodiment of this invention is shown.

An underwater camera construction or means embodying this invention is indicated at 20. Generally speaking, the camera means 20 comprises a camera pressure housing 21 having an elongated main housing portion 22 and an end or base housing portion 23 assembled together in water-tight pressure-tight, sealed relation. The base housing portion 23 provides support means including support members 24 and 25 which extend into the main housing portion and are adapted to carry component camera parts and elements in compact, operative relation within the main housing. In general, such component camera parts are indicated and illustrated (FIGS. 2 and 3) as a motion picture camera 27 of any suitable make and manufacture, an enlarged film magazine or holder 28 adapted to be attached to the camera 27, an electrical motor means 29 for the camera 27, a plurality of batteries 30 to provide electric current for driving the motor means 29, adjustment means 31 for regulating the focus and aperture of the camera 27, a light meter and index 32, and other smaller component camera parts as described hereinafter.

External control means for the enclosed camera 27 are provided and may include handles 35, 36 of pistol grip type attached to the main housing portion 22, handle 35 having an aperture control lever 38 associated therewith, handle 36 having a film control trigger 39 (FIG. 7) associated therewith, and the base housing portion having a focus or distance control lever 40 associated therewith.

The light meter 32 is connected with light sensitive photocell 41 at the front window of the camera means. The camera means 20 is provided with a front window 42 and a back window 43 in alignment and offset from the longitudinal axis of the major portion of the camera housing, said windows 42 and 43 being relatively large and permitting viewing directly through the camera housing. A view finder 44 may also be supported within the housing portion 22 and in cooperable relation to the camera 27.

The camera housing 21 is designed to withstand pressures encountered at depths under water of at least 700 feet and more. The camera housing is constructed so as to permit pressurizing that is, introduction of super-atmospheric pressure into the camera housing. In order to provide a compact, rigid, strong pressure shell or housing adapted to be water tight and to withstand such submersion pressures, the camera housing 21 is made principally of two main integrally reinforced portions, namely, the main elongated housing shell or portion 22 and the base or end housing portion 23. Each housing portion 22, 23 may comprise a casting of a suitable lightweight metal alloy such as an aluminum alloy.

The base housing portion 23 may generally comprise a slightly domed pressure head or circular end wall 46 provided with a circumferential sealing flange 47 provided with a plurality of circumferentially spaced bores 49 for reception therethrough of securement bolts 50. In eccentric or offset relation to the axis of the circular wall 46 may be provided an annular boss-like flange 51 defining a relatively thick annular section of metal as indicated at 52 (FIG. 3), projecting from inner and outer faces of wall 46. The thick section of metal 52 provides an outwardly facing inner shoulder 53 having a groove therein receiving a seal ring 54 for pressure sealing contact with the circumferential inner surface margin of the rear or back window 43. The window 43 may be held in pressure contact against the seal ring 54 by means of an annular locking or pressure ring 55 provided with threaded engagement as at 56 with internal threads provided on the internal surface of the outer portion of flange 51. A gasket ring 57 may be interposed between locking ring 55 and opposed outer marginal surfaces of window 43. It will be apparent that when the locking ring is tightly secured, the window 43 will be held in pressure-tight, water-tight sealing relation between the seal ring 54 and the gasket ring 57. The window 43 may be made of any suitable transparent material suitable for use as an optical material, such as optical glass.

The thick metal section 52 is disposed to resist pressure deformation of the base housing portion under conditions of severe external pressure such as encountered in submergence of a body in the ocean at great depths. It should be noted that the circumferential flange 47 may be provided with an internal annular lip 60 which is disposed within the inner circumference of the end opening of the main housing portion 22 in order to facilitate alignment and positioning of the two housing portions when they are assembled.

The main housing portion 22 (FIG. 9) comprises a generally elongated main section 61 of generally cylindrical form which smoothly merges forwardly with an unsymmetrical tapered or frustoconical housing section 62 which terminates in a short cylindrical section 63 defining a front opening for front window 42. The front section 63 may be provided with an internal configuration similar to that of the annular flange 51 of the base housing portion, and includes an outwardly facing inner shoulder 64 having an annular groove therein for a seal ring 65 against which inner peripheral margins of circular front window 42 may seat in pressure contact. A locking or retaining pressure ring 66 in threaded engagement at 67 with internal threads provided in the section 63 may urge an annular gasket 68 against front window 42 in order to pressure seal the window 42. The window 42 may be made of optical material similar to window 43 and may be provided with an optical coating in accordance with well-known practice.

Housing sections 61 and 62 are provided with a plurality of longitudinally spaced, internal, inwardly extending, annular light baffle ribs 70 lying in planes normal to the axis of housing portion 22, said ribs 70 and the interior surfaces of said sections 61 and 62 being coated or painted with a black, non-reflecting substance so as to reduce to a minimum reflection of light rays entering front or back windows 42, 43. In addition to baffling and reducing unwanted reflection of light rays entering the housing, ribs 70 serve to structurally reinforce the casting of the main housing portion so that the camera housing is capable of structurally withstanding pressure conditions encountered in underwater photography.

At the open end 72 of housing section 61, edge face 73 may be provided with a circumferential groove adapted to receive a seal ring 74 which contacts in pressure engagement the opposed end face 75 of the flange on the base housing portion 23. When the securement bolts 50 are drawn tight, it will be apparent that a pressure-tight seal is afforded in assembly between the two housing portions 22 and 23.

Figure 1:
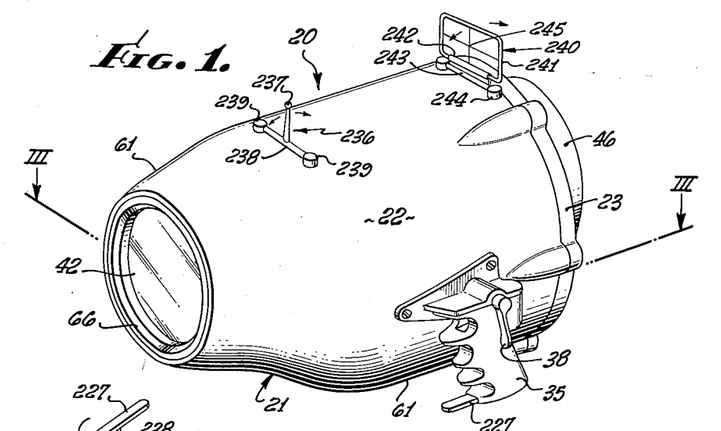
FIG. 1 is a front perspective view of an underwater camera means embodying this invention.
Figure 2:
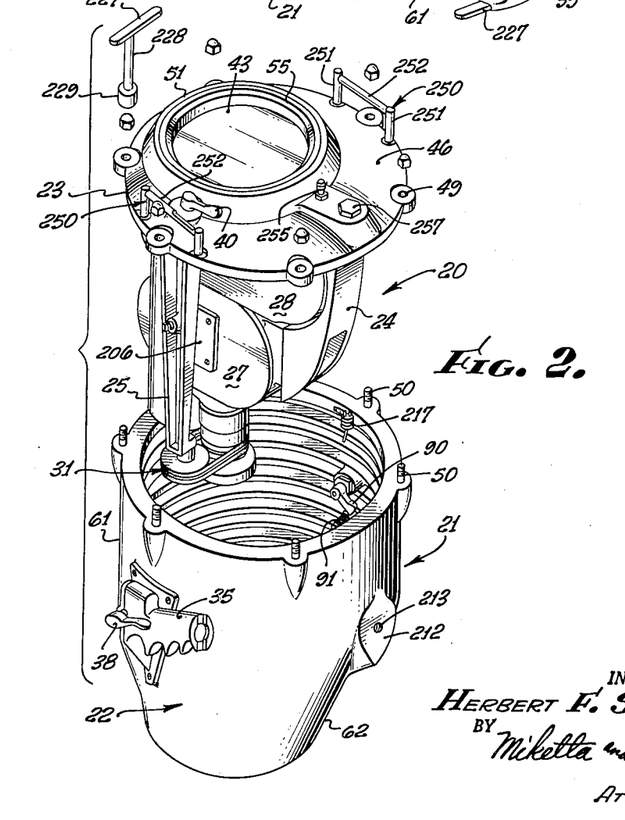
FIG. 2 is an exploded perspective view of the camera means shown in FIG. 1 illustrating separable camera housing portions.

As mentioned above, the base housing portion 23 is provided with support means upon which the various camera components and parts may be assembled so that upon separation of the base housing portion from the main housing portion as indicated in FIG. 2 the camera parts are withdrawn in assembly with the base housing portion and are conveniently accessible for service, change of film, inspection, testing, adjustment, and any other maintenance operation deemed necessary. The support means may comprise an upstanding post or support member 24 which may be secured as by bolts 77 to the wall of the base portion and at a location spaced from rear window 43. The support member 24 may be of suitable metal section such as box or angle (FIG. 5) and one side 78 (FIG. 9) may include an arcuate portion 79 to provide additional space and clearance for the film cartridge magazine 28. At the upper end of support member 24 the side 78 provides a seat for a mounting plate 80 usually carried by a motion picture camera of standard construction such as 27, the plate 80 being provided with a threaded bore 81 adapted to receive a securement bolt 82. The threaded bore 81 normally provides a threaded connection to a tripod mounting device.

Figures 3, 4:
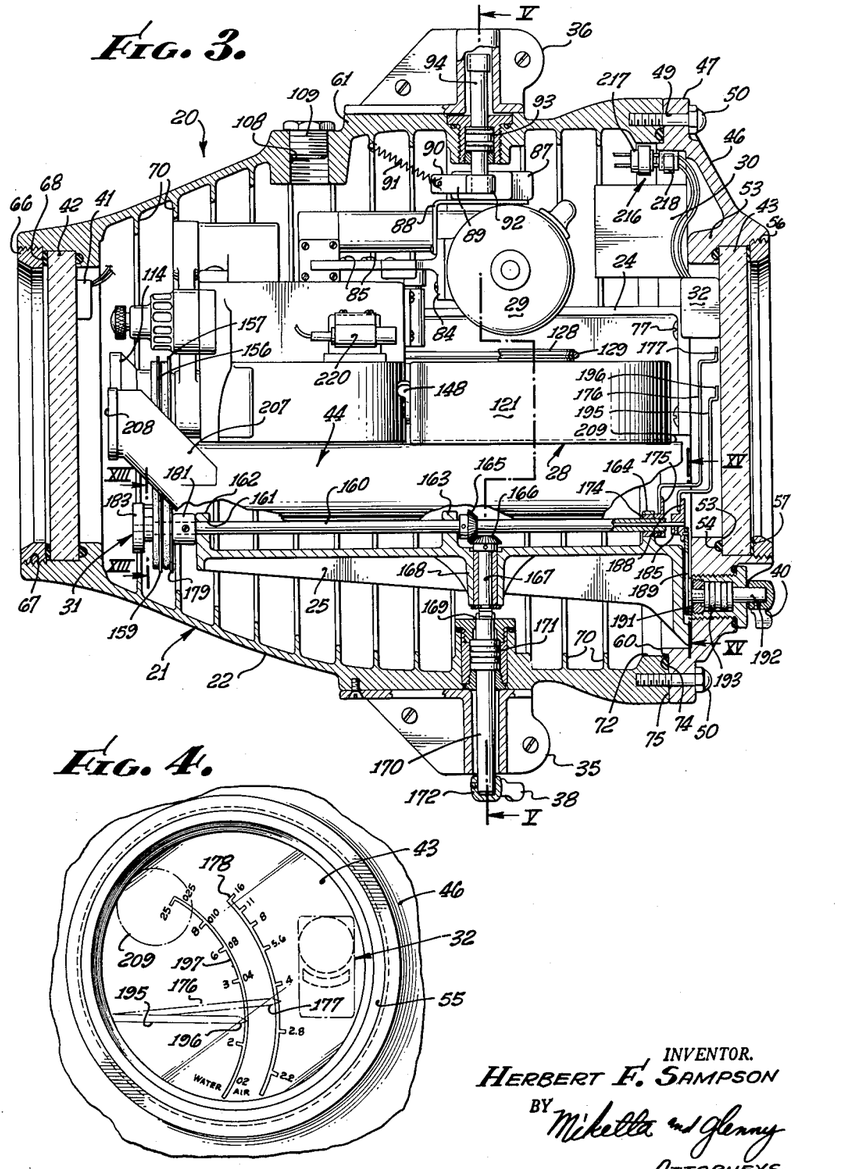
FIG. 3 is a sectional view taken in a plane passing longitudinally through the camera means as indicated by lines III—III of FIG. 1.
FIG. 4 is a fragmentary enlarged view of the rear window of the camera means.

In this example, electric motor 29 for driving camera 27 may include a motor mounting plate 84 secured by suitable spaced screw bolts 85 to the camera casing (FIG. 3). A plurality of batteries 30 secured and supported on the wall 46 of the base housing portion 23 are connected electrically in well-known manner to a motor switch 87 (FIGS. 3, 7) which is electrically connected to the motor means. The motor switch 87 is supported from an angle bracket 88 carried by the motor support plate 84.

The motor switch 87 may be provided with a switch push button 89 which projects from switch 87 and is contacted by switch arm 90 carried at the inner end of trigger shaft 94 and biased to normally open position by spring 91 (FIG. 3). Spring arm 91 is connected at one end to a rib 70 in the housing. The shaft 94 extends through the wall of the housing and pressure seal means 93 of suitable construction is used to provide a water tight seal while permitting turning of the shaft 94. The shaft 94 at its outer end is received within the top portion of handle 36 (FIG. 7) and is provided with a crank arm 95 having a pivotal connection at 96 with the inner end of trigger 39. The main body portion 97 of trigger 39 is slidably carried in the front wall 98 of the handle grip 36. When trigger 39 is depressed or squeezed, crank arm 95 will rotate clockwise as shown in FIG. 7 and such rotation will cause depression of switch arm 90 into contact with button 89 so as to close switch 87 and to energize motor 29 for driving a film strip in said camera through a drive arrangement described hereafter.

Figures 5, 6, 7, 8, 18:
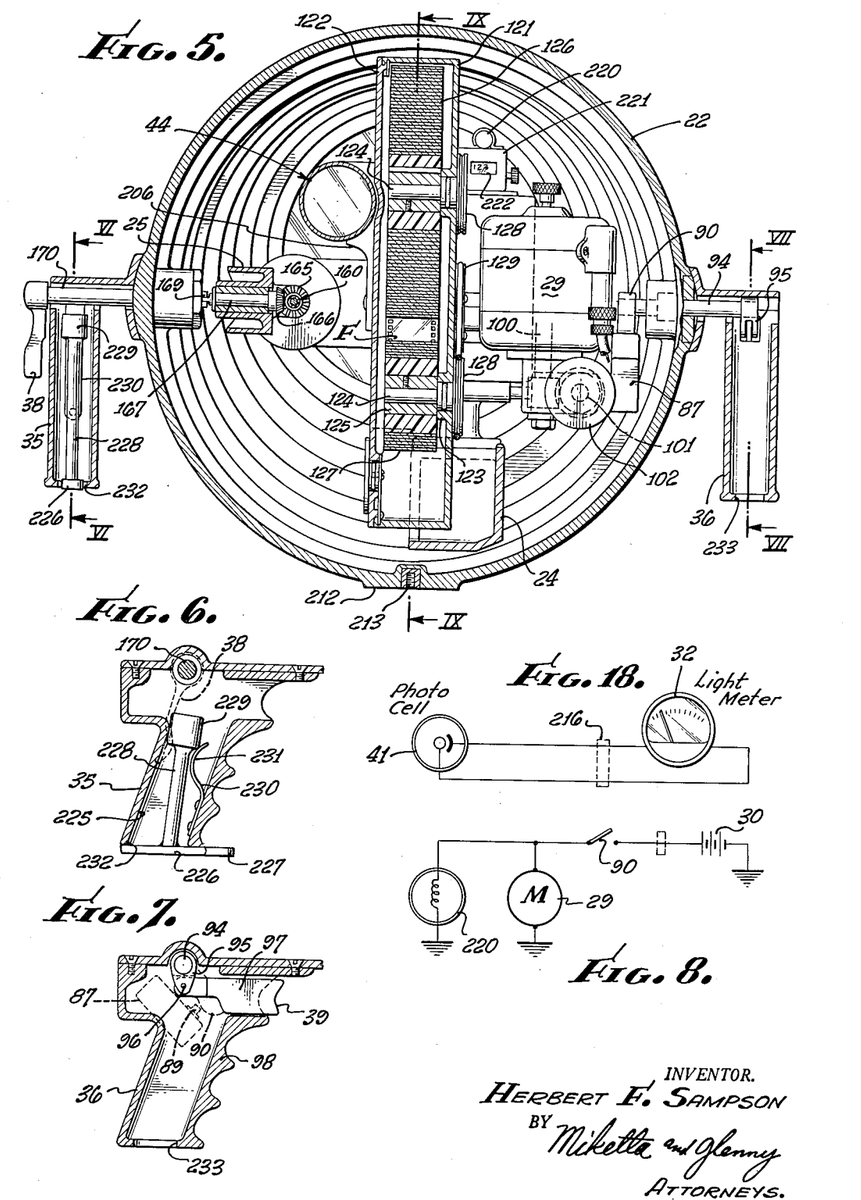
FIG. 5 is a transverse sectional view taken in a transverse plane as indicated by lines V—V of FIG. 3.
FIG. 6 is a fragmentary sectional view taken in the plane indicated by line VI—VI of FIG. 5.
FIG. 7 is a fragmentary sectional view taken in the plane indicated by line VII—VII of FIG. 5.
FIG. 8 is a schematic electrical diagram of the film driving means.
FIG. 18 is a schematic wiring diagram of the photocell and light meter.
Figure 17:
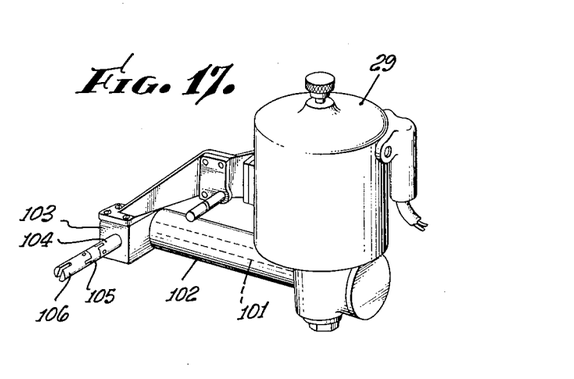
FIG. 17 is a fragmentary perspective view of the motor means and drive for the motion picture camera exemplarily shown in the drawings.

As best seen in FIGS. 5 and 17, motor 29 is provided with a motor shaft 100 having meshed engagement with a worm gear on a shaft 101 which extends longitudinally of the camera housing in a shaft casing 102. The forward end of the shaft 101 extends into a gear box 103 for meshed engagement with bevel gears (not shown) to drive a stub shaft 104 which may be connected through a swivel coupling 105 to a stub shaft 106 having a slotted end for driving engagement with the film-driving means or sprockets of the camera 27 in usual manner. The driving engagement is well known and is not shown in detail. In FIG. 3 it may be noted that housing section 61 may be provided with a theaded port 108 normally closed with a threaded plug 109 when the camera is being driven by a motor as described above. In the event a motor is not used with the camera 27 and it is desired to use a hand crank, plug 109 may be removed and a hand crank inserted through port 108 for driving the film drive sprockets of camera 27 in well known manner.

The camera 27 may include a camera casing 111 of well known form which is shown equipped with a turret lens support 112 which is normally not used in the underwater camera construction of this invention. The turret 112 is positioned so that a single selected lens means 114 may be operably positioned in alignment with front window 42.

Figures 9, 10, 11, 12:
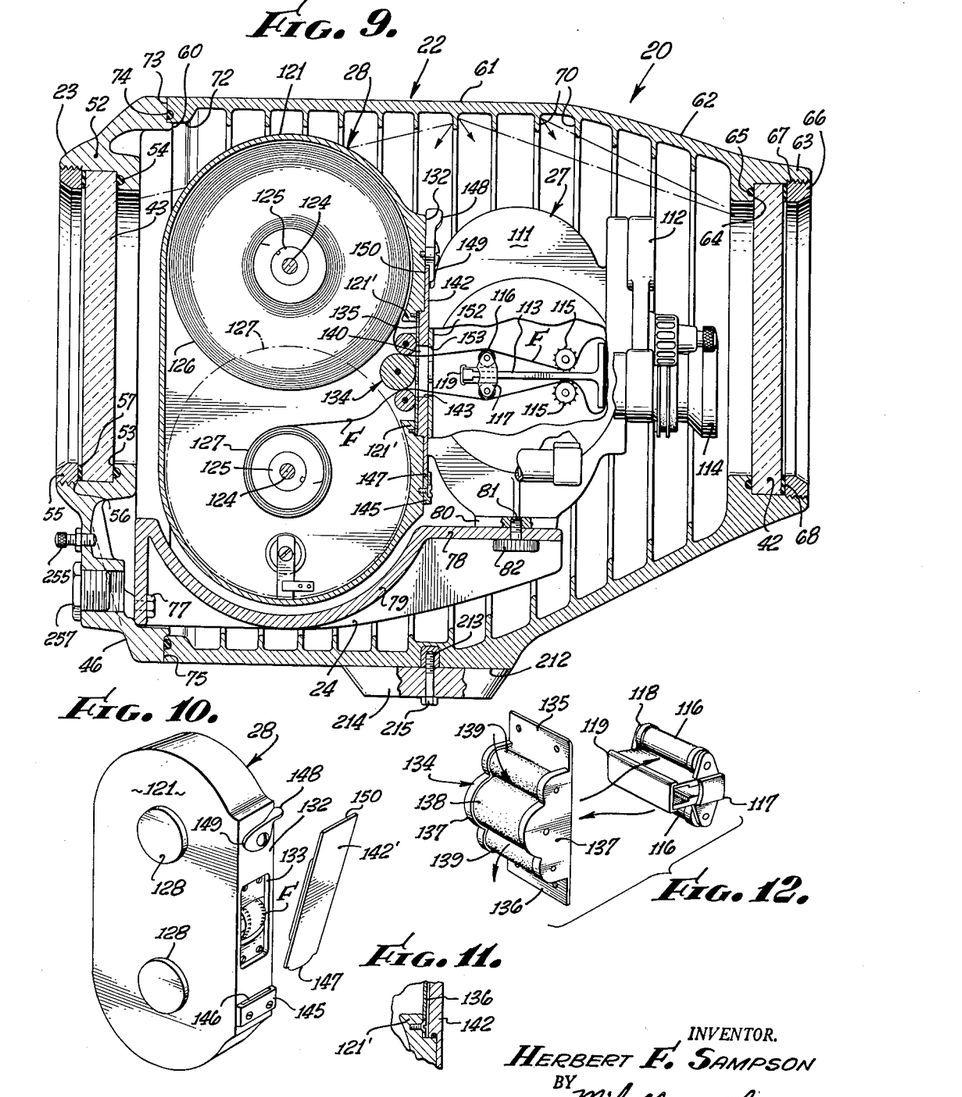
FIG. 9 is a sectional view taken in the longitudinal plane indicated by line IX—IX of FIG. 5.
FIG. 10 is a perspective view of an enlarged film magazine employed with the camera means of this invention.
FIG. 11 is a fragmentary sectional view showing light-sealing means for the cover of the magazine shown in FIG. 10.
FIG. 12 is a perspective enlarged view of the light sealing-means used with the magazine shown in FIG. 10 and camera of this invention.

The camera 20 of this invention may be equipped with enlarged film magazine 28 which may be capable of holding approximately 400 feet of film or more. Such an enlarged magazine is desirable for underwater photography because film changes cannot be readily accomplished under water and the camera operator must return to a boat or to shore to change the film. To provide proper feed of film F to a film support plate 112 at the focal plane of lens means 114 the interior of the camera casing 111 is slightly modified as shown in FIG. 9. The film support plate 112 may be part of a film support and guide member 113 which extends between film drive sprockets 115 toward the back of camera casing 111. Adjacent the back end of film support member 113 a pair of spaced film guide rollers 116 may be rotatably supported in spaced relation from an end member 117 so as to position rollers 116 on opposite sides of the back end of the film support member 113. The assembly of rollers 116 and end member 117 may be removed as a unit to facilitate threading of the film in a loop over the film support plate 112. Opposite ends of rollers 116 may be snapped into a corresponding support bracket 118 carried on the opposite side of the member 113. The end of member 113 may be provided with a cover clip 119 having smooth edge faces to facilitate guiding of the film to and from the rollers 116.

The magazine 28 may comprise a magazine casing 121 provided with a removable side cover 122 (FIG. 5). magazine casing 121 may be provided with spaced internal bosses 123 adapted to provide bearing for spaced film driving shafts 124 provided with suitable hubs 125 to support film reels 126 and 127 (FIG. 9) for film feed and for film takeup respectively. Film shafts 124 may be driven through pulleys 128 and a pulley belt 129 which may be connected with the film drive means in any suitable manner (not shown) as by connection to the shaft driving sprockets 115.

Means are provided on casing 121 for releasably mounting magazine 28 on casing 111 and permitting passage of film F between the magazine 28 and casing 111. As best seen in FIGS. 9–12, a planar front face 132 on casing 121 is arranged to be positioned against a mounting plate 142 secured to the back face of the camera casing 111. The central portion of face 132 is provided with an opening 133 into which may be received a nonlight transmitting film passage assembly or device 134. Device 134 comprises a rectangular base plate 135 having end portions 136 for seating on shoulders 121′ provided on the casing 121 at opposite ends of opening 133. Between ends of the base plate 135 and along the sides thereof may be provided a pair of brackets 137. Brackets 137 freely, rotatably support a relatively large centrally disposed film guide roll 138 in rolling light tight contact with relatively small diameter end rolls 139 on opposite sides thereof. Rolls 138 and 139 may be surfaced with a relatively soft, unabrasive, resilient yieldable material so that a film F passing between roll 138 and the adjacent roll 139 will not be marred or scratched while at the same time sealing the interior of the magazine against light. The base plate 135 is provided with a pair of spaced slots 140 through which film F may pass and it should be noted that rolls 138 and 139 engage interior surfaces of plate 135 at slots 140 to further seal the opening 133 against light transmission.

Mounting plate 142 may have a relatively thick section central portion fitted in opening 133, said central portion having a port 143 opposite slots 153 in the back wall 152 of the camera casing 111. Slots 153 may be open-ended and readily accessible when the side cover of casing 111 is removed to thread or position film F therein, port 143 being also accessible from the same side.

Mounting plate 142 and magazine 28 may be releasably secured together by a socket member 145 on face 132 having a socket 146 therein adapted to receive and retain end portion 147 of plate 142. The opposite end portion 150 of plate 142 may be releasably locked against face 32 by a latch member 148 pivotally mounted on edge face 132 and having a latching portion 149 movable to overlie the end portion 150 of plate 142. Thus the interengagement of socket member 145 and end portion 147, latch portion 149 and portion 150, and the fitted central portion of plate 142 in opening 133 serve to releasably mount and lock magazine 28 to the camera casing 111.

When the magazine 28 is removed from casing 111 for loading and unloading, the film F is normally wound completely on film takeup reel 127. It will be readily apparent that no light can enter magazine 128 because of the non-light transmitting engagement of rollers 138 and 139 as described above. If a different type of film should be desired to be placed in the camera 27 while the film in the camera has not been completely exposed the magazine may be removed and a portion of the film loop extending between slots 140 may be shown at opening 133 in FIG. 10. A storage cover plate 142′ of configuration similar to plate 142 but not provided with an opening 143 may then be secured by socket 145 and latch member 148 so as to completely close the opening 133 for storage purposes.

Figure 14:
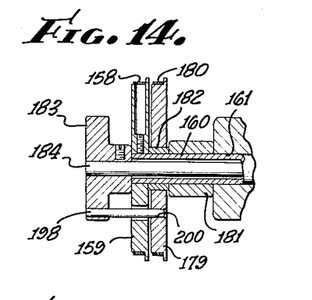
FIG. 14 is a sectional view taken in the planes indicated by lines XIV—XIV of FIG. 13.

Means are provided for external control of the aperture and focus of the motion picture camera 27 within the camera housing 22 and are cooperably connected to an adjustable rotatable aperture ring 156 and cooperably adjustable rotatable ring 157 for adjustment of the focus of the lens, such rings 156 and 157 being well known and a usual arrangement for adjustment of camera lens. In the present example, the aperture adjustment means includes a pulley belt 158 (FIG. 14) associated with the aperture adjustment ring 156 on the lens and extending to and connected with an aperture pulley wheel 159 supported laterally adjacent thereto from support member 25. Wheel 159 may be secured by a set screw to the top end of a hollow, tubular member 160, said member 160 extending through a bearing opening 161 in a front lug 162 on support member 25 which is secured at its base to the end housing portion 23. The support member 25 also includes a central ported lug 163 and a bottom ported lug 164 which also serve as bearing supports for the member 160. Member 160 adjacent to central lug 163 may carry an external bevel gear 165 for meshed engagement with a bevel gear 166 carried at the inner end of a stub shaft 167 supported for rotation in an outwardly extending boss 168 on the support member 25. The shaft 167 terminates in a rectangular or polygonal section end portion 168 which is adapted to be received within a mating slotted end portion 169 of an actuating stub shaft 170. The shaft 170 extends through the side wall of the housing portion 22 and seal means generally indicated at 171 are provided for making the shaft and housing watertight. The shaft 170 extends into the upper portion of pistol grip handle 35 and extends therebeyond for connection at 172 to the aperture control lever 38. Thus by turning control lever 38, the shaft 170 is turned and likewise the shaft 167 which transmits such turning through the bevel gears 166 and 165 to the hollow tubular member 160 to turn the pulley wheel 159, the belt 158, and the aperture control ring 156.

Since the usual aperture markings on the lens 114 are not viewable within the camera housing to visually determine the setting of the aperture the lower end of tubular member 160 may carry a collar 174 provided with an extension 175 upon which may be secured an aperture indicating pointer or needle 176, pointer 176 being bent in suitable manner as shown in FIG. 3 in order to provide an indicating point 177 terminating in close proximity to a curved line 178 marked on back window 43, said curved line being provided with spaced indicia indicating the size of the aperture opening.

Figure 15:
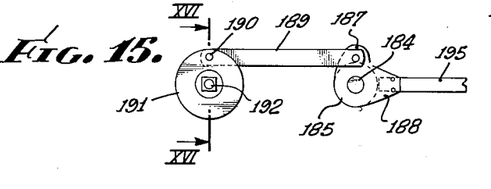
FIG. 15 is a fragmentary view taken in the plane indicated by line XV—XV of FIG. 3 and showing a portion of the focus adjustment means.
Figure 16:
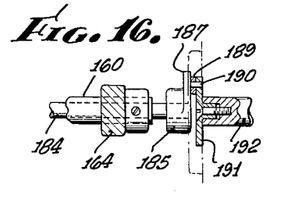
FIG. 16 is a transverse section taken in the plane indicated by line XVI—XVI of FIG. 15.

The focus control means may include a freely rotatable pulley wheel 179 mounted on the upper end of tubular member 160 immediately below the wheel 159 and connected to control ring 157 through a belt 180. The wheel 179 is held in spaced relation from the top lug 162 of the support member 25 by a spacer sleeve 181 and may be mounted on by a spacer bearing 182. The wheels 159 and 179 are held in assembly at the end of the tubular member 160 by a top head 183 which is carried at the outer end of an inner shaft 184 which extends entirely through the hollow tubular member 160 and at its opposite end carries a collar 185 provided with angularly spaced projecting ears 188 and 187 (FIG. 15). The ear 187 may be pivotally connected to a link 189 having a pivotal connection at 190 to the outer circumferential margin of a disc 191 which is fixedly carried on the inner end of an actuating shaft 192 (FIG. 3). Actuating shaft 192 is mounted in sealing means generally indicated at 193 in the wall 46 of the end housing portion 23 and at its outer end carries the focus adjustment lever 40. Fixed to the ear 188 of the collar 185 may be an indicating arm 195 suitably bent so as to position its indicating end 196 proximate to a curved line 197 marked on the inner face of the back window 43, said curve being marked with indicia to indicate focal adjustment for water and for air. It will be understood that since the water is a different medium than air that the focal adjustment in water and air will be different.

Figure 13:
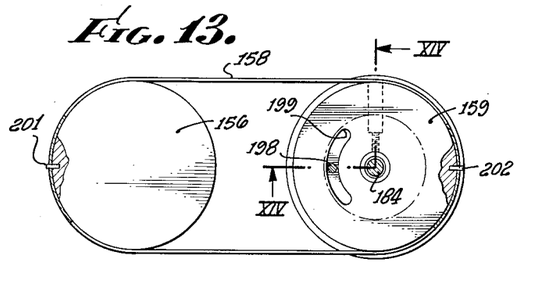
FIG. 13 is an enlarged transverse sectional view taken in the plane indicated by line XIII—XIII of FIG. 3 and showing the focus and aperture adjustment means.

When the focal adjustment lever 40 is turned, such turning motion is transmitted through the link 189 to the collar 185 to turn the inner shaft 184. To transmit this turning action to the wheel 179 the head 183 may be provided with a pin 198 spaced from and parallel to the axis of the shaft 184, said pin extending through an arcuate slot 199 provided in the wheel 159 and connected at 200 with the wheel 179 which is mounted for free rotation on the tubular member 160. Thus turning of the lever 40 is transmitted to the wheel 179 and to lens ring 157 which controls adjustment of the focus of the lens of the camera. It will be readily apparent from FIG. 13 that the belts 158, 180 may be fixed to the lens rings and to the wheels by means of stop pins 201 and 202 respectively.

It may be noted that the diameters of wheels 159 and 179 are the same and also are equal to the diameters of adjustment rings 156 and 157 so that a direct operative relation is provided. Curved lines 178 and 197 are drawn with the common axis of shaft 184 and tubular member 160 as their center and subtend a relatively large arc so as to be readily observed when the camera 20 is in water.

The view finder 44 may be carried on the camera casing 111 by means of a suitable bracket 206 secured to the side of the camera casing adjacent to the support member 25. The forward end of the view finder 44 may be offset as at 207 so as to position the viewing end 208 of the view finder closely adjacent to the lens 114 to reduce parallax between the optical systems of the view finder and camera 27. The back end 209 of the view finder is positioned closely to the back window 43 for convenient viewing therethrough. It should be noted when the camera is pointed toward an object which is to be photographed that in addition to viewing the object through the view finder by placing the eye close to the back window 43, the general location of the object can be readily determined by viewing the object through the windows 43 and 42 in the space provided on opposite sides of the view finder as best seen in FIG. 5, and thus prompt location of an object being viewed is facilitated.

Means for attaching weights or ballasts to the camera means 20 for lending stability to the camera 20 in water may be provided by a flattened surface 212 formed on housing section 61 adjacent to the back end of the unsymmetrical frustoconical section 62. A threaded bore 213 is provided in the wall of section 61 and one or more ballast weights 214 may be attached thereto as by a securement bolt 215 (FIG. 9).

FIG. 18 schematically illustrates the circuit of the photo cell and light meter, photo cell 41 being connected through a plug and socket connection 216 to light meter 32. By reference to FIG. 3 it will be apparent that the plug and socket connection 216 comprises a male portion 217 carried by the main housing portion 22 adjacent the open end 72 thereof and a socket means 218 carried by the end housing portion 23 in alignment with the male plug portion 217. Thus when the end housing section 23 is secured to the main housing portion an electrical connection is automatically made between the plug portion 217 and socket portion 218.

In FIG. 8 is schematically shown a circuit in which the batteries 30 are connected to the motor 29 and to a film footage lamp 220. A footage lamp 220 is carried on top of a footage-indicating housing 221 in which there is provided footage-indicating means connected with the film drive means. A window 222 is provided in the back end of the footage-indicating housing for viewing through the back window 43. It will be apparent when the main housing portion 22 and the end housing portion 23 are brought into assembled relation the switch arm 90 will be positioned above the button 89 so that upon actuation of the trigger 39 the button will be depressed and the motor energized.

It may be noted that the pistol grip 35 (FIG. 6) is hollow and provides a chamber 225 adapted to receive a socket wrench 226 comprising a handle 227, a shank 228 and a socket end 229 adapted to fit the stud bolts 50 which secure the end housing 23 to the main housing 22. The wrench 226 may be secured in chamber 225 by a spring means 230 having a curved portion 231 adapted to releasably engage and snap beneath the socket head 229 adjacent the shank 228. Handle 227 may be partially recessed in the bottom wall or end of the pistol grip 35 in such a manner that the forwardly extending portion of handle 227 may form a part of the contoured bottom finger recess. Handle 227 is slightly narrower than a bottom drainage port 232 so that drainage of the pistol grip 35 may take place when the camera is out of water. Similarly pistol grip 36 (FIG. 7) is provided with a drainage port 233 in the bottom wall of the pistol grip.

To facilitate sighting the underwater camera for rapid action shots means are provided on top of the camera housing 22 for rapidly aligning the camera with an object to be photographed. Such sighting means may comprise a front sight and a rear sight. The front sight may comprise an upstanding sight member 236 having a top bead 237. Member 236 may be connected to a transverse mounting member 238 having opposite ends pivotally mounted in support means 239. Suitable positioning means (not shown) may be provided in the support means 239 for locating the front sight member 236 in an upright upstanding position. The rear sight 240 may comprise a rectangular frame 241 connected at 242 to a transverse member 243 pivotally mounted at opposite ends in support means 244 in a manner similar to the front sight. Rectangular frame 241 may be provided with crossed lines or reticle means 245. The pivotal mounting of the front and rear sight members permits such members to collapse or fold in either direction against the adjacent surface of the camera housing 22. Such collapsing action of the front and rear sight members is desirable in order to prevent damage to the sight members when the underwater camera is being inserted into or withdrawn from space between rocks, recesses, or caves under water.

It may be noted from FIG. 2 that the end housing portion 23 is also provided with a pair of diametrically spaced combination handle and stands 250 each comprising a pair of upstanding legs 152 interconnected by a transverse rod 252. The handles 250 may not only be used to support and hold the underwater camera 20 in the water, if so desired, but are also especially adapted to support camera means 20 when the camera construction is being assembled or disassembled. The legs 251 may support the end housing portion 23 and all of the components carried thereby in an upright position upon a table surface without damage to the back window or other portions of the camera.

As previously mentioned, the camera construction of this invention is adapted to be pressurized in order to withstand submersion in water to great depth. In order to conveniently pressurize the interior of the camera construction a valved air inlet 255 of well known form may be provided in a section of the end housing portion 23 just below the back window. The valved air inlet 255 permits air under pressure to be introduced into the camera housing. A plugged port at 257 adjacent to the air valve means 255 may be provided for an adapter means to fit electrical cables or other apparatus to the camera housing if so desired.

It is important to note that for purposes of assembly and disassembly that the camera construction 20 may be placed on a surface and supported on the combination handle and stand 250 so that when the stud bolts are removed the upper housing portion 22 may be simply lifted off of the end housing portion 23. By such motion the various means for interconnecting the external control means on the housing portion 22 are automatically released from the control means interiorly of the housing carried by the end housing portion 23. The camera components supported by the end housing portion 23 may thus be readily examined, replaced, tested, and any other maintenance or service operations may be readily performed. Assembly of the housing portions is readily accomplished by simply lowering the housing portion 22 onto the end housing portion 23, the control means being interlocked, and the end housing 23 may be tightly secured by the stud bolts provided therefor. It will thus be readily understood that an underwater camera construction is provided which has extreme versatility in camera control, maneuverability, handling, maintenance, and assembly and disassembly.

While various modifications and changes may be made in the camera construction described above which come within the spirit of this invention, all such changes and modifications coming within the scope of the appended claims are embraced thereby.

I claim:

1. A readily assembled and disassembled underwater camera construction comprising in combination a camera housing means including a separable main housing having a cylindrical wall defining a housing axis and an end housing plate, said main housing and said end plate having windows in alignment on a longitudinal axis spaced from the axis of the main housing; spaced longitudinally extending support members carried by said end plate on opposite sides of the associated window, said support members extending longitudinally into the main housing, one of said members being adapted to support a camera with the camera lenses adjacent the window in said main housing, the other of said support members being adapted to support composite control means for adjusting the focus and aperture of the lenses on said camera; said control means including concentrically arranged shafts supported by the other of said members and having means interconnecting said shafts with said focus and aperture means on the camera, each of said shafts carrying an associated indicator element adjacent to the window in said end plate; and means carried by said main housing and said end plate cooperably interconnected with said shafts during assembly of said main housing and said end plate for actuation of said shafts whereby adjustment is afforded of said focus and aperture of said camera.

2. A camera construction as stated in claim 1 wherein said means interconnecting said shafts and main housing includes a lever at the side of said cylindrical wall.

3. A camera construction as stated in claim 1 wherein said means interconnecting one of said shafts and said end plate includes a lever carried by said end plate adjacent the window carried thereby.

4. A camera construction as stated in claim 1 including a motor carried within said main housing, operably connected to said camera, and supported from said one support member; and means extending through said cylindrical wall for detachable connection with a switch means for said motor whereby said motor is subject to external control.

5. A readily assembled and disassembled underwater camera construction comprising in combination: a camera housing means including a separable main housing having a cylindrical wall defining a housing axis and provided with integral internal, annular reinforcing ribs longitudinally spaced with respect to said housing axis, said housing means including an end housing plate; said main housing and said end plate having windows in alignment on a longitudinal axis spaced from the axis of the main housing; spaced longitudinally extending support members carried by said end plate, said support members extending longitudinally into the main housing, one of said support members being adapted to support a camera with the camera lenses adjacent the window in said main housing, independently operable focus control means and aperture control means for the lenses on said camera supported by the other of said support members; each of said control means including a shaft; means interconnecting focus and aperture means on the camera with the respective shafts of said focus and aperture control means, each of said shafts carrying an associated indicator element adjacent to the window in said end plate; and means carried by the main housing and said end plate cooperably interconnected with said shafts during assembly of said main housing and said end plate for actuation of said shafts.

6. In combination with an underwater camera construction: an integral cast camera housing portion including a front circular section provided with a transverse window opening defining an upper longitudinal axis, a frusto-conical, unsymmetrical section extending rearwardly from said front circular section, a cylindrical section merging with said unsymmetrical section and having an axis spaced below said axis of said front circular section, said cylindrical and frusto-conical sections being provided with integral internal, annular longitudinally spaced reinforcing ribs, and a flattened external surface at the bottom of said cylindrical section and rearwardly of the frusto-conical section adapted to provide attachment means for ballast weights for stabilizing said camera when submerged.

References Cited in the file of this patent

UNITED STATES PATENTS

| | | |
|---|---|---|
| 1,087,996 | Tessier | Feb. 24, 1914 |
| 1,451,096 | Hagen | Apr. 10, 1923 |
| 2,001,682 | Jackman | May 14, 1935 |
| 2,001,683 | Jackman | May 14, 1935 |
| 2,019,059 | Sherman | Oct. 29, 1935 |
| 2,058,532 | Tuttle | Oct. 27, 1936 |
| 2,223,525 | Miller | Dec. 3, 1940 |
| 2,487,868 | Grigsby | Nov. 15, 1949 |
| 2,573,885 | Whitman et al. | Nov. 6, 1951 |
| 2,752,107 | Schenck | June 26, 1956 |
| 2,926,572 | Weiss | Mar. 1, 1960 |
| 2,944,474 | Dennis | July 12, 1960 |

OTHER REFERENCES

"A Bantam-Weight Camera for Underwater Photography," Moncrief, American Cinematographer, vol. 32, issue 2, pages 52 and 64, published February 1951.